Figure 1:
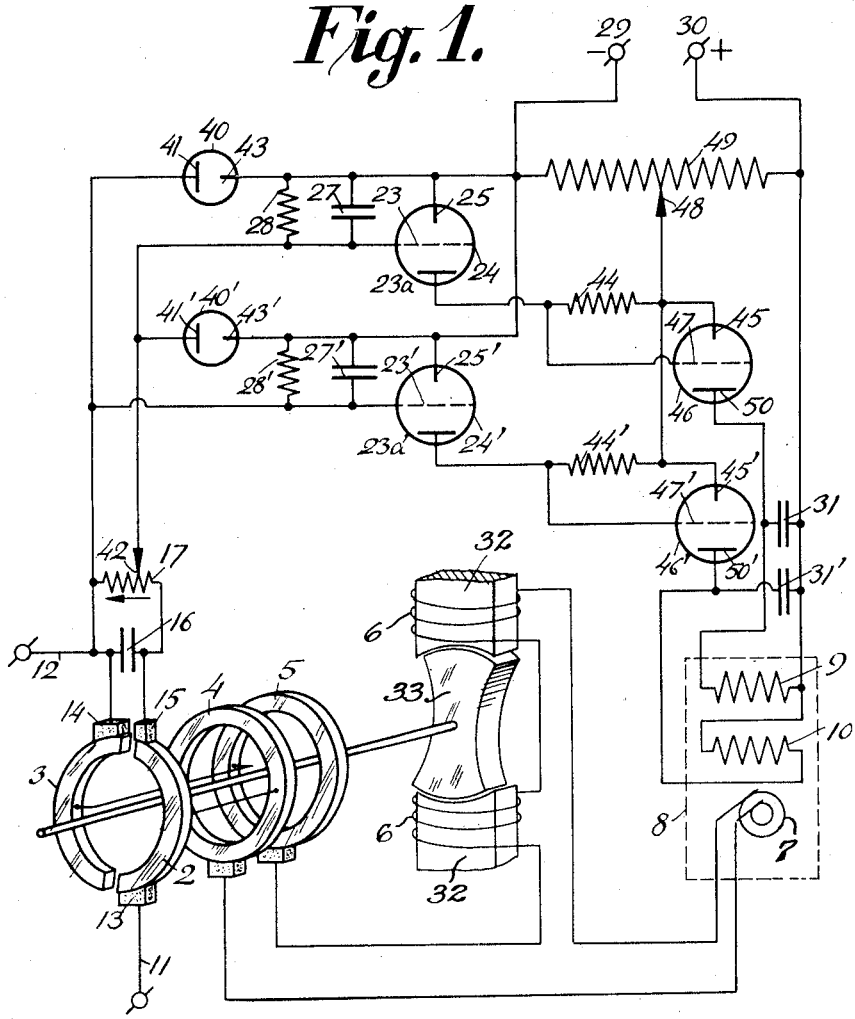

Jan. 16, 1934.   B. C. VON PLATEN ET AL   1,943,905
COMMUTATION OF ELECTRIC MACHINES
Filed Nov. 18, 1931

INVENTORS
their ATTORNEY

Patented Jan. 16, 1934

1,943,905

UNITED STATES PATENT OFFICE 1,943,905

COMMUTATION OF ELECTRIC MACHINES

Baltzar Carl von Platen and Gunnar Axel Grubb, Stockholm, Sweden

Application November 18, 1931, Serial No. 575,702, and in Sweden November 19, 1930

8 Claims. (Cl. 171—228)

This invention relates to dynamo electric machines such as generators, motors and rotary transformers, and more particularly to a method and means for regulating the commutating voltage of such machines so that injurious sparking is prevented.

Commutation of the windings of dynamo electric machines should preferably take place at that moment or during that time interval when no voltage is induced therein or when the current flowing therein is reduced to zero. Such exact commutation, however, involves great difficulties, particularly at heavy loads or if high voltages are employed, in which case injurious sparking may occur and cause considerable power losses or injury to the machine or may even endanger the entire plant.

It is accordingly of greatest importance to reduce the voltage in the windings during commutation, hereinafter called the commutating voltages, to a minimum and to maintain these voltages within permissible limits so that sparking is prevented or reduced to such a value that the normal operation of the machine is not interfered with.

In order to improve commutation, it has heretofore been suggested to divide the commutator brushes into two or more parts and to connect between those parts impedances of various types such as condensers, inductances, resistances or combinations thereof. It has also been suggested to construct the brushes in two sections with a resistance incorporated between various sections of the brush itself whereby a compact brush unit is obtained which provides various constructional advantages.

In either of the above cases, if commutation is incorrect, a voltage or current impulse which, for convenience, will be hereinafter referred to as a voltage impulse, is obtained between the various parts of the brush whenever the space between two commutator segments passes the brush, or more definitely, whenever a commutator segment leaves the front section of the brush.

In accordance with the present invention, these impulses are utilized for regulating the commutating voltage so that the impulses themselves are always prevented from reaching undesirable values. More specifically, the impulses are applied to regulating devices such as commutating poles or windings or special commutating generators or magnetizing or exciting generators, or the like, which will be herein referred to as commutation generators. The impulses may first be applied to one or more translating devices which are connected to the brush parts as, for example, to amplifying devices or control devices which are utilized for operating relays, the latter being associated with the commutation generator and adapted to control the operation thereof. In case relays are employed, these may consist of space discharge tubes or of electromagnetic relays, or the like. Two or more of the above-mentioned translating devices may be combined, if desired, to obtain the required operating results.

The invention provides means for utilizing the impulses caused by incorrect commutating voltages for substantially instantaneously correcting said voltages before the impulses are able to reach harmful proportions. It is accordingly especially useful on high voltage machines where sparking has been particularly difficult to control.

Figure 2:
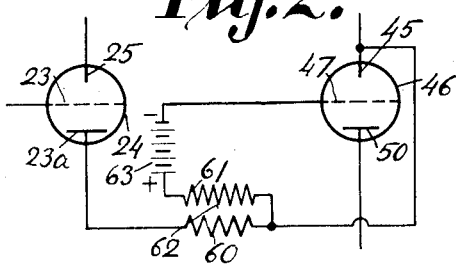

The invention will be more fully described hereinafter with reference to the accompanying drawing, in which Fig. 1 is a schematic diagram of a preferred form of the invention; and Fig. 2 is a schematic diagram of a modified form thereof.

In the figures corresponding parts are designated by similar reference numerals, and although certain specific terms are used for convenience in designating various features of the invention, it is intended that these terms receive as broad an interpretation as the state of the art will permit.

Referring more particularly to Fig. 1, the invention as shown is applied to a dynamo electric machine having commutator segments 2 and 3, which are connected by slip rings 4 and 5 to induced winding 6 which is adapted to carry alternating currents. Winding 6 is associated with pole pieces 32 which cooperate with a rotor 33 of magnetic material. Said rotor may have any suitable source of field excitation (not shown). Said winding 6 is connected in series with a commutating or induced winding represented by slip rings 7 of a commutation generator 8 having exciting windings 9 and 10 which are arranged in mutually opposed relationship. Commutator segments 2 and 3 are connected to a direct current line 11, 12 by means of brushes 13 and 14. One of said brushes may be provided with an auxiliary brush 15 which is connected thereto through a condenser 16 and a potentiometer 17. It is obvious that the two parts of the brush may be formed as a single unit and the resistance corresponding to potentiometer 17 may be included between the parts of the brush. In any case, a voltage impulse is set up between the brush parts 14 and 15 whenever under or over commutation occurs, and this impulse tends to cause a current to flow through the potentiometer 17 in one direction or the other, depending on the particular condition of commutation.

Condenser 16 may be employed to introduce a time constant and to prevent sudden changes of current in potentiometer 17, which might introduce undesirable operating characteristics into the control mechanism to be described.

A pair of channels interconnect potentiometer 17 and windings 9 and 10 of commutation generator 8. These channels include space discharge tubes 24 and 24' respectively having input circuits including grids 23 and 23' and cathodes 25 and 25' which are connected in parallel across a portion of potentiometer 17 determined by the position of variable contact 42. The input circuits of said tubes are also provided with grid leak resistances 28 and 28' and with condensers 27 and 27', which are all of such dimension as to provide the desired operating characteristics for said tubes. In the grid return leads of said tubes are also connected rectifiers 40 and 40' having electrodes 41, 43, and 41', and 43', respectively. Said rectifiers are connected in opposition with respect to the current in potentiometer 17 so that current impulses in said potentiometer are applied to one or the other of said tubes 24, 24' depending upon the direction of said impulses.

The output circuits of said tubes 24, 24' include resistances 44 and 44' which are connected to anodes 23a and 23a', respectively thereof. Anode potential is applied by variable tap 48 on potentiometer 49, which is connected across a suitable source of potential represented by negative terminal 29 and positive terminal 30.

Resistances 44 and 44' are connected between the cathodes 45 and 45' and grids 47 and 47' of space discharge tubes 46 and 46'. The anodes 50 and 50' of said tubes are connected, respectively, through windings 9 and 10 to positive terminal 30. Condensers 31 and 31' are connected across said windings and may be designed to produce the desired operating characteristics.

In the operation of the above described system, a voltage impulse between brush parts 14 and 15 tends to produce a current through potentiometer 17 in a direction which depends upon the condition of commutation; that is, whether winding 6 is under or over commutated. Assume, for example, that the direction of the current is that shown in the arrow in Fig. 1. Tubes 24 and 24' are also assumed to be operated, as by controlling the grid bias thereof, in a manner which is well known in the art, so that equal space currents are passed therethrough. The current in potentiometer 17 in the direction of the arrow impresses a potential on grid 23', which is negative with respect to that of cathode 25', and thereby increases the negative bias of said tube and accordingly decreases the space current passed therethrough. Rectifier 40 prevents the voltage drop in potentiometer 17 from causing current flow in the input circuit of tube 24, and the operation of said tube 24 is accordingly unaffected. The decreased space current in tube 24' causes a decrease in current passing through resistance 44', which is connected in the input circuit of tube 46'.

The adjustment of the operating characteristics of tubes 24 and 24' is normally such that the current flowing through resistances 44 and 44' causes a voltage drop therein of sufficient magnitude to produce a negative bias on grids 47 and 47' such that no space current flows in tubes 46 and 46' or such that a predetermined equal value of space current flows through both of said tubes. The decrease in current through resistance 44', caused as outlined above in response to the current flow in potentiometer 17, accordingly decreases the negative bias of tube 46' and permits a larger space current to flow therein. This in turn causes an increase in current passing through winding 10 and thereby unbalances the two windings and causes a resultant excitation of the induced winding of commutation generator 8 in such a direction that a voltage is produced in said winding for correcting the commutating voltage of winding 6 and for correcting the condition which gave rise to the voltage impulse between brushes 14 and 15.

It is to be understood that if the condition of commutation is such that the direction of the voltage impulse between brushes 14 and 15 is reversed, the impulse would be applied to tube 24 instead of tube 24' and would cause operation of tube 46 and increase the current passing through winding 9 in the same manner as above described with respect to winding 10.

The system may be operated so that normally equal amounts of currents are passed through windings 9 and 10 or it may be operated so that normally no current is passed through either of these windings. In any case, an increase in current through one of the windings will unbalance the field excitation of the commutation generator whereby a voltage is induced in its induced winding for the purpose above specified.

It is obvious that various modifications may be made in the connections and the operating elements of the above circuit. For example, a transformer may be utilized for coupling tubes 24 and 46 and tubes 24' and 46' in place of resistances 44 and 44', respectively. Such a system is disclosed in Fig. 2, which shows merely a portion of the circuit of Fig. 1 including tubes 24 and 46 and their associated leads. In this modification the cathode 23a of tube 24 is connected through the primary 60 of the transformer 62 to a suitable source of plate potential. The secondary 61 of transformer 62 is connected, in series with battery 63, between grid 47 and filament 45 of tube 46. Battery 63 is arranged normally to apply a negative bias to grid 47 of such value that space current is prevented from flowing through said tube.

In the operation of this modified arrangement, pulsating direct current is passed through primary winding 60 of transformer 62 in the manner specified in connection with resistance 44 of Fig. 1. This pulsating direct current induces an alternating potential in secondary winding 60 which is superimposed upon the potential of battery 63 and serves to decrease the negative bias of said tube and to cause an increased amount of space current to flow therein.

The exact method of operation outlined above has been given for purposes of illustration only and it is to be understood that the adjustments and operating characteristics of the various tubes may be varied as desired in any particular instances.

For the sake of simplicity, sources of filament current have been omitted from the drawing. It is to be understood, however, that the filaments of the various tubes may be heated in any well-known manner. It is also obvious that if a larger current output is required, a plurality of tubes connected in parallel or in cascade may be utilized in place of either tubes 46 or 24. In certain instances it may be desirable to connect two or more of the various tubes or rectifiers in parallel in order to prevent disturbance of the circuits in case of injury or destruction of any one of the elements.

Potentiometer 17 may comprise an ohmic resistance or an inductive reactance. In the latter case, the impedance thereof increases with the frequency of impulses passing therethrough. This may be advantageous in certain instances inasmuch as a higher potential may be tolerated between brush parts at high frequencies than at low frequencies. A similar increase in impedance at high peripheral velocities of the commutator may be obtained by various other means.

The impulses arising between the brush parts may also be utilized for operating other types of devices, and the invention is not to be limited to the specific device which is disclosed herein by way of example only.

The commutation generator 8 may be excited exclusively by means of exciting windings 9 and 10 or may be excited by such windings together with various other exciting means. At certain low speeds pulsating current may pass through the relays, which would have an undesirable effect. Such conditions may be avoided by suitable design of the electrical constants of the circuit, as for example, of condensers 31 and 31'.

On applying the invention to direct current transformers, separate commutation generators may be used for the primary and secondary sides of the machine, and the voltage in the commutating winding of each of the generators may be so regulated as to prevent sparking in the commutators with which they are associated.

Various other changes and modifications will be apparent to a person skilled in the art. The foregoing are given by way of example only.

What we claim is:

1. In an electric machine, a winding, a commutator and brushes associated therewith, means for receiving a voltage impulse in response to incorrect commutation of said winding, a commutation control device adapted to correct said commutation, means for controlling said device comprising a pair of channels interconnecting said first means and said device, each channel containing a pair of space discharge tubes connected in cascade, means whereby an impulse of a given direction differentially operates said channels, means whereby said channels normally produce no effect on said commutation control device, and means operated in response to said impulse for causing said control device to correct the commutating voltage which gave rise to said impulse.

2. In an electric machine, a winding, a commutator and brushes associated therewith, means associated with one of said brushes for receiving a voltage impulse in response to incorrect commutation of said winding, a commutation control device adapted to correct said incorrect commutation, means for controlling said device comprising a pair of channels interconnecting said first means and said device, each channel containing a pair of space discharge tubes connected in cascade, oppositely disposed rectifiers associated with each of said channels whereby an impulse of a given direction differentially operates said channels, means whereby said channels normally produce no effect on said commutation control device, and means operated in response to said impulse for causing said control device to correct the incorrect commutating voltage which gave rise to said impulse.

3. In an electric machine, a winding, a commutator and brushes associated therewith, an impedance associated with one of said brushes for receiving a voltage impulse in response to incorrect commutation of said winding, a commutation generator adapted to correct said incorrect commutation, and means for controlling said generator comprising a pair of channels interconnecting said impedance and said generator, each channel containing a pair of space discharge tubes connected in cascade, means whereby an impulse of a given direction differentially operates said channels, means whereby said channels normally produce a balanced exciting effect on said commutation generator, said effect being unbalanced in response to said impulse and producing a resultant excitation adapted to correct the commutating voltage which gave rise to said impulse.

4. In an electric machine, a winding, a commutator and brushes associated therewith, one of said brushes comprising two peripherally spaced parts, an impedance connected between said parts for receiving a voltage impulse in response to incorrect commutation of said winding, a commutation generator adapted to correct said incorrect commutation, and means for controlling said generator comprising a pair of channels interconnecting said impedance and said generator, each channel containing a pair of space discharge tubes connected in cascade, oppositely disposed rectifiers in said channels and oppositely directed whereby an impulse of a given direction differentially operates said channels, means whereby said channels normally produce no exciting effect on said commutation generator, and means responsive to said impulse for producing a resultant excitation of said generator adapted to correct the incorrect commutating voltage which gave rise to said impulse.

5. In an electric machine, a winding, a commutator and brushes associated with said winding, a commutation generator for controlling the commutating voltage of said winding, said generator having oppositely disposed exciting windings, space discharge tubes having their anode circuits connected through said windings, means for normally biasing said tubes to balance the flow of current in said windings, and means for varying the bias of said tubes to alter the space current therein, said last means comprising space discharge tubes having their input circuits connected in parallel across an impedance, rectifiers associated with each of said input circuits and oppositely directed whereby an impulse in a given direction differentially operates said input circuits, one of said brushes being formed in a pair of peripherally spaced parts, said impedance being connected between said parts whereby the impulse arising due to incorrect commutation controls said space discharge tubes and thereby unbalances the current through said exciting windings and produces a voltage in said commutation generator adapted to compensate for the incorrect commutating voltage in said first winding.

6. In an electric machine, a winding, a commutator and brushes associated with said winding, a commutation generator for controlling the commutating voltage of said winding, said generator having oppositely disposed exciting windings, space discharge tubes having their anode circuits connected through said windings, means for normally biasing said tubes to prevent flow of space current therein, said means comprising a resistance connected in the grid circuit thereof, and means for passing a current through said resistance for controlling the voltage drop therein and thereby controlling the bias of said tubes, said last means comprising space discharge tubes having their output circuits connected through said resistance and having their input circuits connected in parallel across an impedance, rectifiers associated with each of said input circuits and oppositely directed whereby an impulse in a given direction differentially operates said input circuits, one of said brushes being formed in a pair of peripherally spaced parts, said impedance being connected between said parts whereby the impulse arising due to incorrect commutation controls said space discharge tubes and thereby controls the current through said exciting windings and produces a voltage in said commutation generator adapted to compensate for the incorrect commutating voltage in said first winding.

7. In an electric machine, a winding, a commutator and brushes associated therewith, one of said brushes being formed in a plurality of peripherally spaced parts, means whereby voltage impulses are produced between said parts in response to an incorrect commutating voltage in said winding, a commutation generator adapted to compensate for said incorrect commutating voltage and to produce substantially sparkless commutation, said generator having a pair of exciting windings and means controlled by said impulses for varying the current passed through said windings, said means comprising a pair of channels interconnecting said brushes and said windings, oppositely directed rectifying means connected in said channels whereby impulses in a given direction differentially operate said channels, each of said channels comprising a pair of space discharge tubes connected in cascade, the first of said tubes being controlled in accordance with said impulses, the second of said tubes having its space current path connected to one of said exciting windings, means for normally causing the effects of the current passing through said exciting windings to balance out, and means whereby said currents are unbalanced in response to impulses arising between said brush parts, thereby producing a resultant excitation of said commutation generator adapted to correct the commutating voltage of said first winding and to produce substantially sparkless commutation.

8. In an electric machine, a winding, a commutator and brushes associated therewith, one of said brushes being formed in a plurality of peripherally spaced parts, an impedance connected between said parts, means whereby a voltage impulse is produced in said impedance in response to incorrect commutation of said winding, a pair of translating channels connected in parallel across said impedance, oppositely directed rectifiers associated with said channels whereby an impulse in a given direction differentially actuates said channels, a space discharge tube associated with each of said channels and controlled in accordance with said impulse, a second space discharge tube associated with each of said channels and normally biased to prevent passage of space current therein, means controlled by said first tubes for varying said bias in accordance with the direction and intensity of said impulse, a commutation generator having a pair of oppositely disposed exciting windings, said second tubes having their space current paths connected through said exciting windings and arranged so that normally no excitation is produced thereby, the change in bias of said second tubes produced in response to said impulse serving to unbalance said windings and to produce a resultant excitation, and a commutating winding associated with said generator and adapted to control the commutating voltage of said first winding whereby the condition which gave rise to said impulse is corrected by said commutation generator and substantially sparkless commutation is obtained.

GUNNAR AXEL GRUBB.
BALTZAR CARL von PLATEN.